(12) United States Patent
Arangarasan et al.

(10) Patent No.: US 11,745,710 B2
(45) Date of Patent: Sep. 5, 2023

(54) SPRING BRAKE ACTUATOR FOR USE IN A COMMERCIAL VEHICLE AND COMMERCIAL VEHICLE THEREWITH

(71) Applicant: WABCO India Limited, Chennai (IN)

(72) Inventors: Senthil Kumar Arangarasan, Chennai (IN); Ganesh Kumar Muthuraj, Madurai (IN); Pratheesh Kumar Prem Kumar, PN.Palayam (IN)

(73) Assignee: ZF Commercial Vehicle Control Systems India Limited, Tamil Nadu (IN)

( * ) Notice: Subject to any disclaimer, the term of this patent is extended or adjusted under 35 U.S.C. 154(b) by 0 days.

(21) Appl. No.: 17/551,264

(22) Filed: Dec. 15, 2021

(65) Prior Publication Data

US 2022/0194341 A1 Jun. 23, 2022

(30) Foreign Application Priority Data

Dec. 18, 2020 (IN) .............................. 202041055283

(51) Int. Cl.
*B60T 13/58* (2006.01)
*B60T 13/38* (2006.01)

(52) U.S. Cl.
CPC ............ *B60T 13/588* (2013.01); *B60T 13/38* (2013.01)

(58) Field of Classification Search
CPC ................................ B60T 13/38; B60T 13/588
See application file for complete search history.

(56) References Cited

U.S. PATENT DOCUMENTS

| | | | | | |
|---|---|---|---|---|---|
| 3,782,251 | A | * | 1/1974 | Le Marchand | B60T 17/083 92/63 |
| 4,480,531 | A | * | 11/1984 | Mylius | B60T 17/086 92/29 |
| 4,850,263 | A | * | 7/1989 | Rumsey | B60T 17/083 92/48 |
| 9,550,485 | B2 | * | 1/2017 | Spath | B60T 17/083 |
| 9,988,033 | B2 | * | 6/2018 | Spath | B60T 17/221 |
| 2006/0131116 | A1 | | 6/2006 | Plantan et al. | |
| 2013/0075211 | A1 | * | 3/2013 | Plantan | F16D 65/28 188/170 |
| 2017/0057480 | A1 | * | 3/2017 | Schwartz | B60T 17/083 |
| 2019/0135253 | A1 | | 5/2019 | Oster et al. | |
| 2020/0040955 | A1 | * | 2/2020 | Darner | B60T 17/088 |
| 2022/0194341 | A1 | * | 6/2022 | Arangarasan | B60T 13/38 |

FOREIGN PATENT DOCUMENTS

| | | | | |
|---|---|---|---|---|
| DE | 102015115488 A1 | * | 3/2017 | ............ B60T 17/083 |
| JP | 2008151213 A | | 7/2008 | |
| WO | 0181728 A1 | | 11/2001 | |
| WO | WO-2011074706 A1 | * | 6/2011 | ............ B60T 17/083 |
| WO | 2017200550 A1 | | 11/2017 | |

\* cited by examiner

*Primary Examiner* — Vishal R Sahni
(74) *Attorney, Agent, or Firm* — Dickinson Wright PLLC (57) ABSTRACT

A spring brake actuator for a commercial vehicle includes a service brake portion (4) and a spring brake portion (6) that has a housing (8, 108) with a first end (10, 110) proximal to the service brake portion (4), a wall section (12, 112) extending from the first end (10, 110), a second end (14, 114) distal to the service brake portion (4), and a locking mechanism (16, 116) for locking the first and second ends (10, 110, 14, 114) to the wall section (12, 112). The locking mechanism (16, 116) is arranged between the wall section (12, 112) and the second end (14, 114) of the housing (8, 108).

12 Claims, 6 Drawing Sheets

SPRING BRAKE ACTUATOR FOR USE IN A COMMERCIAL VEHICLE AND COMMERCIAL VEHICLE THEREWITH

TECHNICAL FIELD

The invention relates to a spring brake actuator for use in a commercial vehicle, the actuator comprising a service brake portion and a spring brake portion, the spring brake portion having a housing comprising a first end being proximal to the service brake portion, a wall section extending from the first end, a second end being distal to the service brake portion, and a locking means for locking the ends to the wall section.

BACKGROUND

Spring brake actuators of the aforementioned type are widely used in the commercial vehicle industry, in particular to provide a service braking function, as well as an emergency and parking brake function to the vehicles braking system. In spring brake actuators, the entire actuator can be understood as a combination of a service brake portion which is configured to accomplish the service braking function, and a spring brake portion which provides the emergency and parking brake functionality. The spring brake portion is arranged in a housing which comprises at least two ends or sections. In state of the art spring brake portions, a first end being proximal to the service brake portion is typically releasably mounted to a wall section and a second end of the housing. With the help of a locking mechanism, the housing parts are locked with respect to one another. The locking mechanism needs to be able to withstand high spring forces that may be applied upon either side of the housing.

Although these systems are well-proven, there is still room for improvement. Since in state of the art devices, the locking mechanism is arranged at the proximal end of the housing at a so-called pressure zone of the parking chamber, the locking mechanism is arranged at the center of the device. This positioning, however, occupies a large volume, which, in turn, results in an increase in device length as well as in generating a dead volume in the parking chamber.

SUMMARY

Therefore, it was an object of the invention to provide a spring brake actuator for use in a commercial vehicle that overcomes the above-mentioned issues as far as possible. In particular, it was an object of the invention to provide a spring brake actuator comprising a more compact spring brake portion and to improve the accessibility of the locking mechanism.

According to the invention, the locking mechanism is arranged between the wall section and the second end of the housing. With the help of this, the locking mechanism is moved away from the pressurized zone of the parking chamber and away from the center of the device towards the second end, which is well-accessible. Additionally, the proposed design occupies a smaller volume which results in a decrease in device length as well as a reduction of dead volume in the parking chamber. All in all, the spring brake portion and the spring brake actuator as a whole are more compact, compared to state of the art solutions.

Preferably, the spring brake actuator comprises a spring brake portion piston located in the housing for applying a braking force, the spring brake portion piston comprising a piston pipe that is configured to transfer the braking force to the service brake portion, and a compression spring located between the second end of the housing and the spring brake portion piston, the compression spring being effective to push the spring brake portion piston away from the second end.

According to yet another preferred embodiment, the second end comprises a base plate for enclosing the housing at the second end. Such a base plate is easy to assemble and provides the required structural integrity for accommodating the spring forces occurring during operation of the device.

It is preferred that the base plate comprises a concentric bead extending towards the interior cylinder housing. The bead provides a contact surface for the spring brake portion piston.

According to yet another preferred embodiment, the actuator comprises a brake release device, the brake release device comprising a brake release bolt for moving the spring brake portion piston against a force of the compression spring towards a release state, and wherein the base plate comprises a threaded boss for receiving the thread portion of the brake release bolt therein. Integrating the threaded boss into the base plate has been found to be beneficial to reduce the complexity of the actuator and to facilitate its mountability. Preferably, the threaded boss is arranged at the outside surface of the base plate. With the help of this, no additional volume within the housing is occupied by the threaded boss.

It is furthermore preferred that the threaded boss is attached to the base plate by means of welding. Connecting the two components by means of welding ensures a durable connection and enables a cost-effective production.

According to yet another preferred embodiment, the wall section comprises a circumferential flange, the flange and the base plate each having at least one bore arranged therein, wherein the locking mechanism comprises at least one bolt nut being guided through the bores, for mounting the base plate to the wall section. Utilizing a combination of bore and bolt nut for the locking mechanism has been found to be beneficial to ensure a convenient mountability of the components and provide a durable connection between them while at the same time, the components are easily accessible for maintenance operations.

According to an alternative preferred embodiment, the locking mechanism comprises a circumferential projection arranged at the base plate, for crimping the base plate around a circumferential flange arranged at the wall section. Compared to solutions having bores and locking nuts, this assembly is more compact and more cost-effective to manufacture. On the other hand, maintenance operations may be more difficult compared to the previously mentioned solution. Hence, depending on the desired application, either one of the locking mechanisms may be applied.

According to yet another alternative preferred embodiment, the locking mechanism comprises a twist lock connection, for mounting the base plate to the wall section. The twist lock connection is an alternative solution to using bolt nuts or crimping. A twist lock connection allows for an easy opening of the housing. Such solution may be beneficial in case frequent maintenance operations are required.

Preferably, at least one seal is arranged between the base plate and the wall section. With the help of the seal, the sealing of the base plate with respect to the wall section is improved.

It is furthermore preferred that the first end comprises a cover surface, the cover surface being arranged opposite from the base plate, and wherein the cover surface is substantially flat. Such a housing is easy to manufacture wherein a large contact surface is provided for connecting the spring brake portion housing to the surface part housing or parts thereof.

Preferably, the cover surface comprises a boss for accommodating the piston pipe. With the help of such boss, the piston pipe is durably guided within such boss and through the cover surface.

Preferably, the spring brake actuator comprises a flange, the flange being attached to the cover surface at the second end, the flange at least partially forming a service brake portion housing. Preferably the flange and/or the boss are attached to the cover surface of the housing by means of welding.

According to yet another preferred embodiment, the housing, flange and/or the plate comprise or are made of the following material: sheet metal.

In a further aspect, the invention relates to a commercial vehicle comprising at least one spring brake actuator, wherein the spring brake actuator is a spring brake actuator according the previous embodiments. The commercial vehicle take advantage of the same benefits and preferred embodiments as the spring brake actuator according the invention. In this regard, reference is made to the above explanations and the content is included herein.

The aspects of the disclosure might best be understood from the following detailed description taken in conjunction with the accompanying figures. The figures are schematic and simplified for clarity, and just show details to improve the understanding of the claimed invention while other details are left out. Throughout, the same reference numerals are used for identical or corresponding parts. The individual features of each aspect may each be combined with any or all features or other aspects.

These and other aspects, features and/or technical effects will be apparent from and elucidated with reference to the illustrations described hereafter.

DETAILED DESCRIPTION OF THE DRAWINGS

Figure 1:
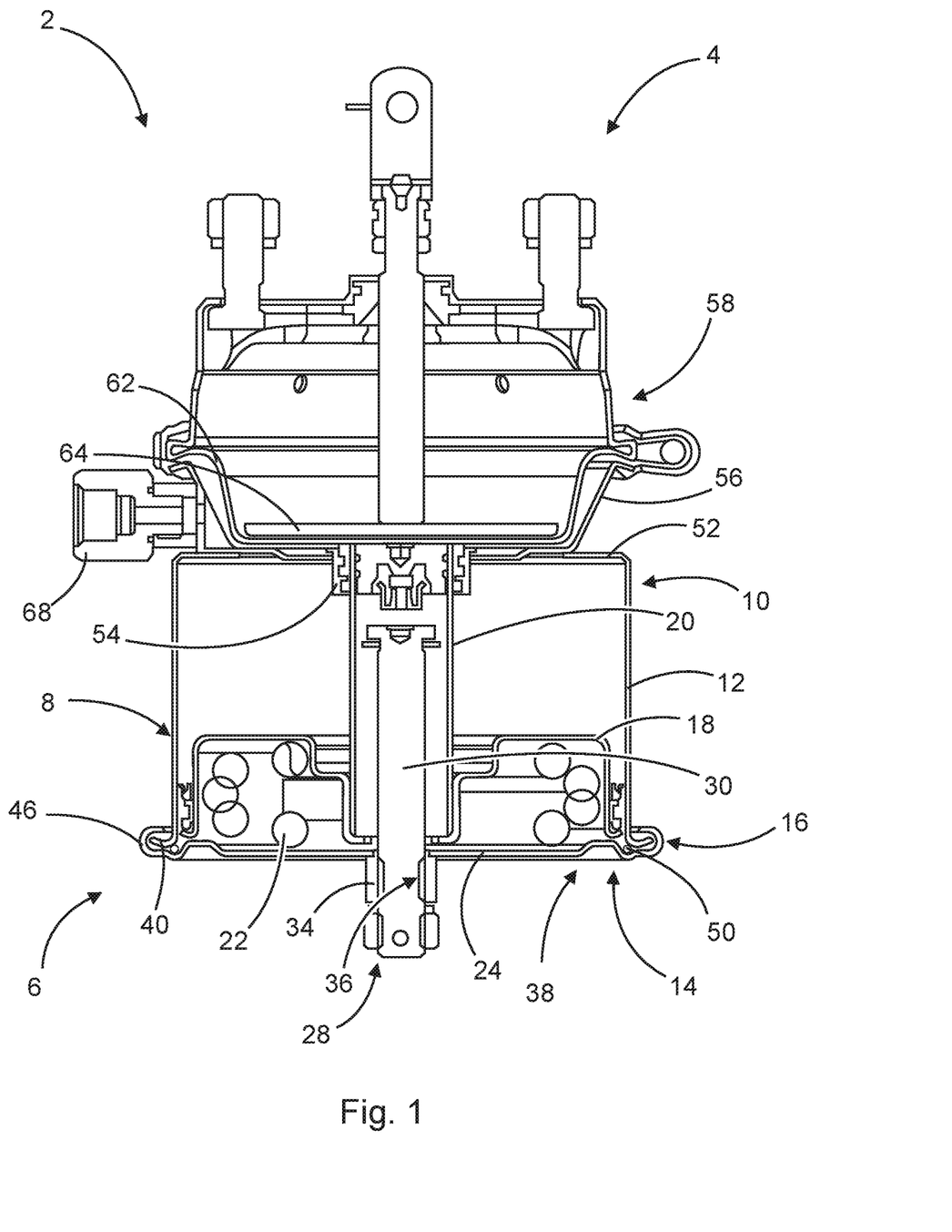
FIG. 1 shows a preferred embodiment of a spring brake actuator according the concept of the invention in a sectional view.

FIG. 1 shows a spring brake actuator 2. The spring brake actuator 2 comprises a service brake portion 4 and a spring brake portion 6. The spring brake portion 6 has a housing 8. The housing 8 comprises a first end 10 being proximal to the service brake portion 4. The housing 8 furthermore comprises a wall section 12 extending from the first end 10.

Moreover, the housing 8 comprises a second end 14 being distal to the service brake portion 4. The housing 8 furthermore comprises a locking mechanism 16. The locking mechanism 16 is arranged between the wall section 12 and the second end 14.

The spring brake actuator 2 furthermore comprises a spring piston 18 located in the housing 8 for applying and braking force. The spring brake portion piston 18 comprises a piston pipe 20. The piston pipe 20 is configured to transfer the braking force to the service brake portion 4. The spring brake actuator 2 furthermore comprises a compression spring 22 located between the second end 14 of the housing 8 and the spring brake portion piston 18. The compression spring 22 is effective to push the spring brake portion piston 18 away from the second end 14. The second end 14 comprises a base plate 24 for enclosing the housing 8 at the second end 14. The spring brake actuator 2 furthermore comprises a brake release device 28.

The brake release device 28 comprises a brake release bolt 30 for moving the spring brake portion piston 18 against a force of the compression spring 22 towards a release state. The base plate 24 comprises a threaded boss 34 for receiving a threaded portion 36 of the brake release bolt 30 therein. Hence, a rotation of the brake release bolt 30 leads to an axial movement of the brake release bolt 30 within the spring brake actuator 2.

The threaded boss 34 is arranged at the outside surface 38 of the base plate 24. The threaded boss 34 is attached to the base plate 24 by means of welding. The locking means 16 comprises a circumferential protection 46 arranged at the base plate 24. The circumferential protection 46 allows for a crimping of the base plate 24 around a circumferential flange 40 arranged at the wall section 12. The locking mechanism 16 may also comprise a twist lock connection for mounting the base plate 24 to the wall section 12, this configuration, however, is not shown in the figures.

A seal 50 is arranged between the base plate 24 and the wall section 12. The first end 10 of the spring brake portion housing 8 comprises a cover surface 52. The cover surface 52 is arranged opposite from the base plate 24. The cover surface 22 is substantially flat. The cover surface 52 comprises a boss 54 for accommodating the piston pipe 20.

Additionally, the spring brake actuator 2 comprises a flange 56. The flange 56 is attached to the cover surface 52 at the second end 14. The flange 56 at least partially forms a service brake portion housing 58. The flange 56 and/or the boss 54 are attached to the cover surface 52 of the housing 8 by means of welding. The service brake portion 4 comprises a diaphragm 62 acting on a service brake portion piston 64. Pressurized air is introduced in the service brake portion housing 58 by means of a pressure inlet 68.

Figure 2:
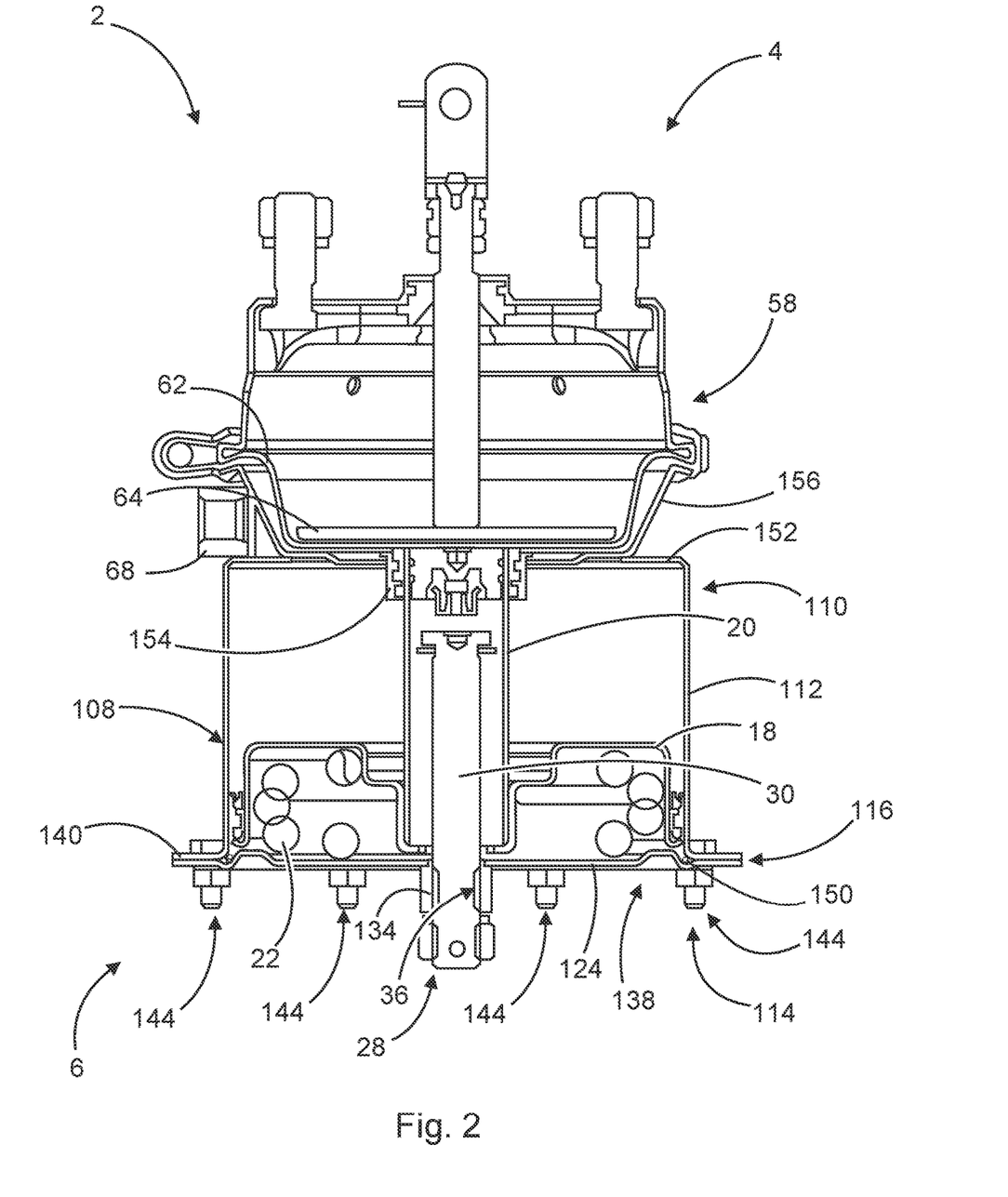
FIG. 2 shows a spring brake actuator comprising an alternative embodiment of a spring brake portion housing in a sectional view.

FIG. 2 shows the spring brake actuator 2 having an alternative embodiment of a spring brake portion housing 108. The housing 108 comprises a first end 110 being proximal to the service brake portion 4 and a wall section 112 extending from the first end 110. The housing 108 furthermore comprises a second end 114 being distal to the service brake portion 4 and a locking mechanism 116. The locking mechanism 116 is arranged between the wall section 112 and the second end 114 of the housing 108. The second end 114 comprises a base plate 124 for enclosing the housing 108 at the second end 114.

The base plate 124 comprises a threaded boss 134 for receiving a threaded portion 36 of the brake release bolt 30 therein. The threaded boss 134 is arranged at the outside surface 138 of the base plate 124. The threaded boss 134 is attached to the base plate 124 by means of welding. The wall section 112 comprises a circumferential flange 140. The flange 140 and the base plate 124 each comprise at least one bore 142 (see FIG. 4a) arranged therein. The locking mechanism 116 comprises at least one bolt nut 144 being guided through the bores 142, for mounting the base plate 124 to the wall section 112. In FIG. 2, four bolt nuts 144 are shown. Furthermore, a seal 150 is arranged between the base plate 124 and the wall section 112. The housing 108 and/or the base plate 124 comprise or are made of sheet metal. The cover surface 152 comprises a boss 154 for accommodating the piston pipe 20. Attached to the cover surface 152 is a flange 156.

Figure 3A:
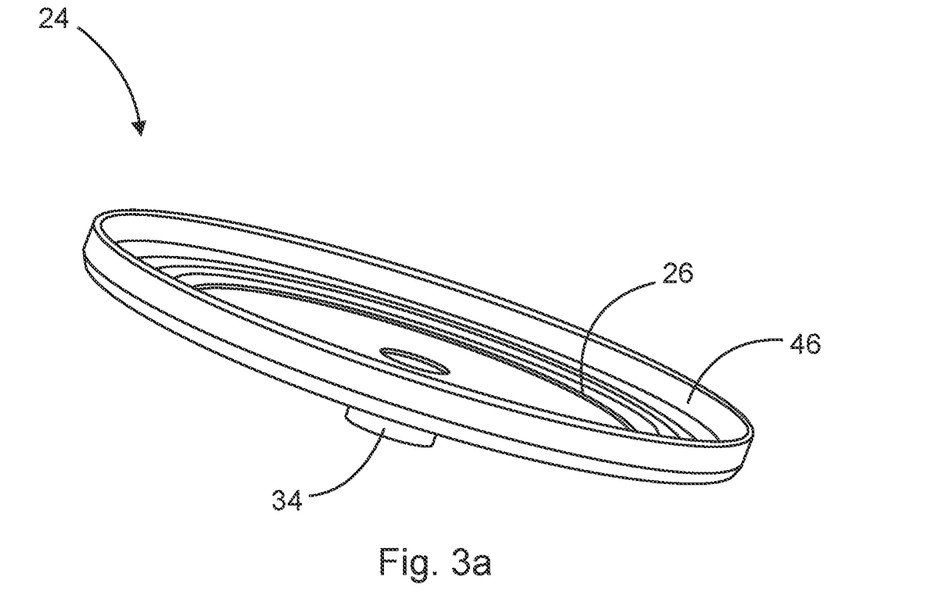
FIGS. 3a, 3b, 4a and 4b show detailed views of base plates of spring brake actuators according to the concept of the invention.
Figure 3B:
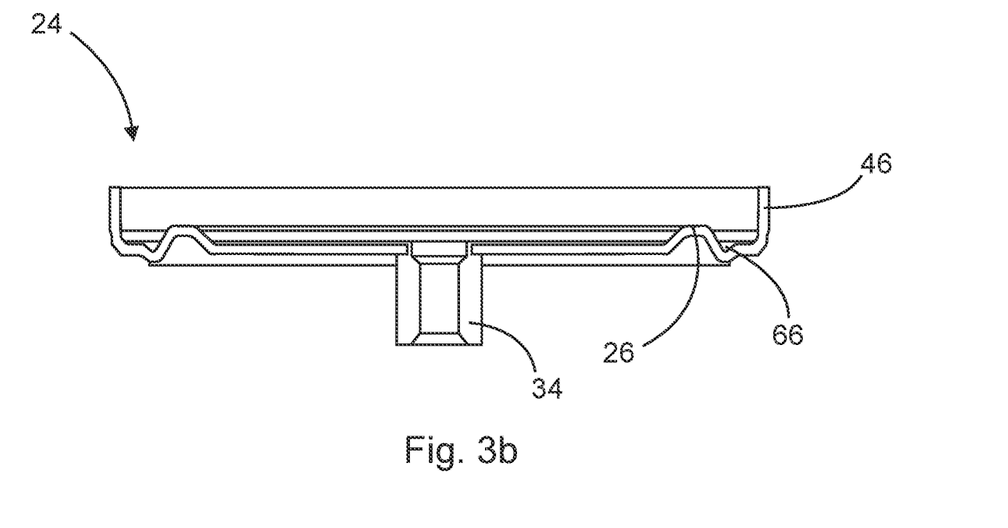

FIGS. 3a and 3b show a base plate 24. The base plate 24 comprises a concentric bead 26 extending towards the interior of the housing 8. The base plate 24 furthermore comprises a circumferential protection 46. Additionally, the threaded boss 34 is shown, which is attached to the base plate 24 by means of welding. The base plate 24 furthermore comprises a seal holder 66 for accommodating the seal 50.

Figure 4A:
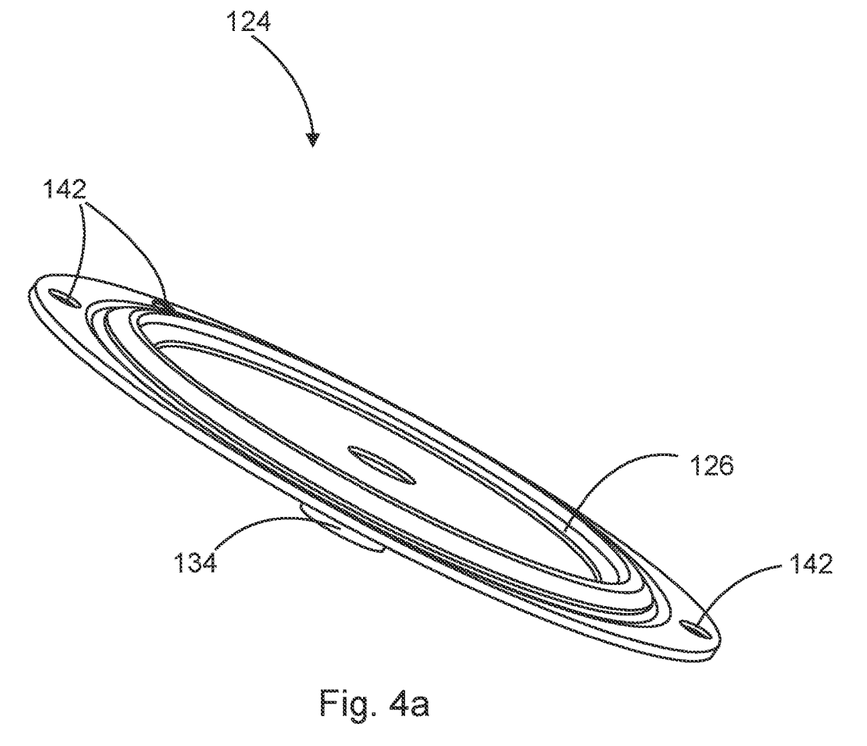
Figure 4B:
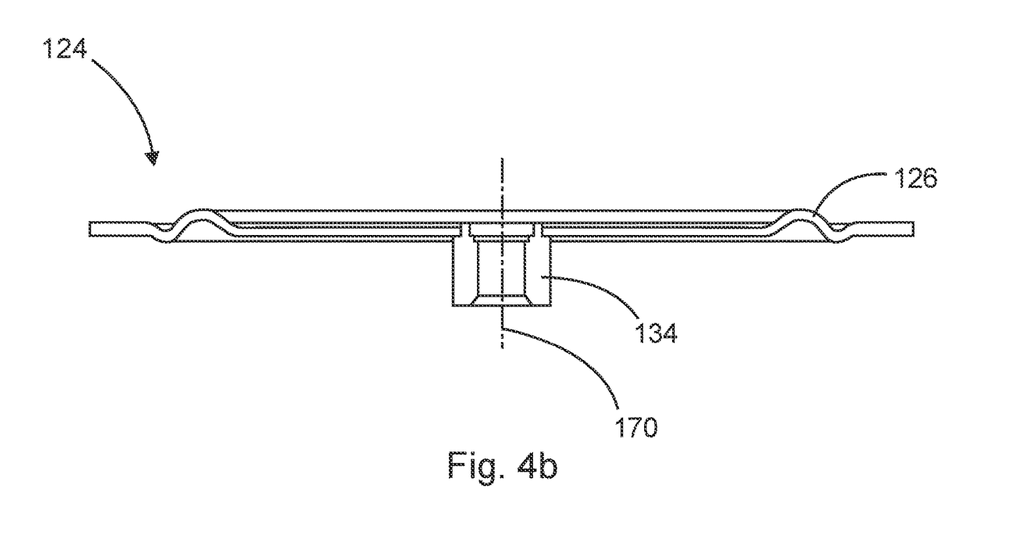

FIGS. 4a and 4b show an alternative embodiment of the base plate 124. Such base plate 124 comprises a concentric bead 126 and a threaded boss 134 which are similar to the embodiment of FIGS. 3a and 3b. In contrast to the embodiment shown in FIGS. 3a and 3b, the base plate 124 of FIGS. 4a and 4b comprises bores 142. The bores 142 are arranged coaxially around a central axis 170.

Figure 5:
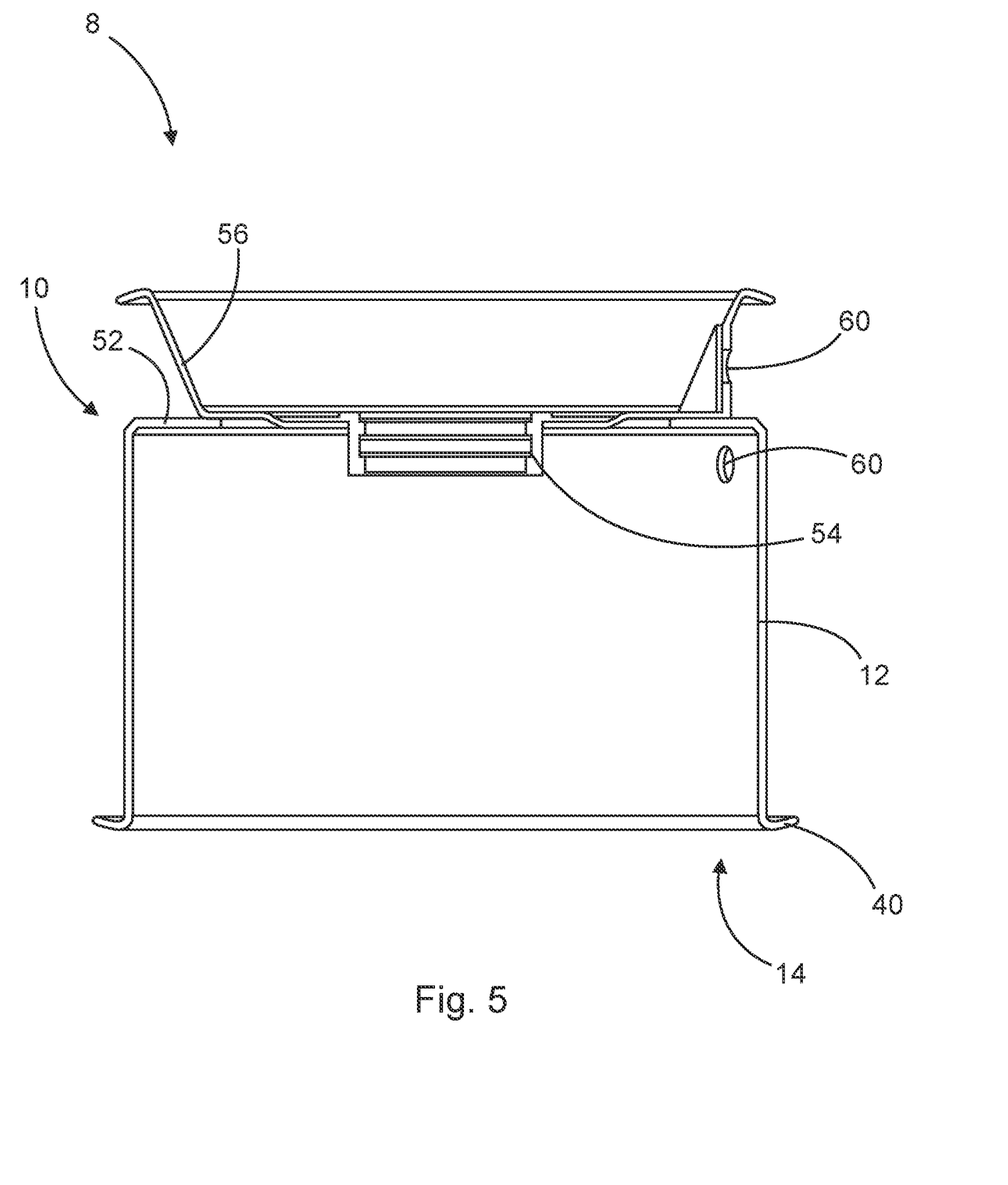
FIGS. 5 and 6 show spring brake portion housings according to the concept of the invention.
Figure 6:
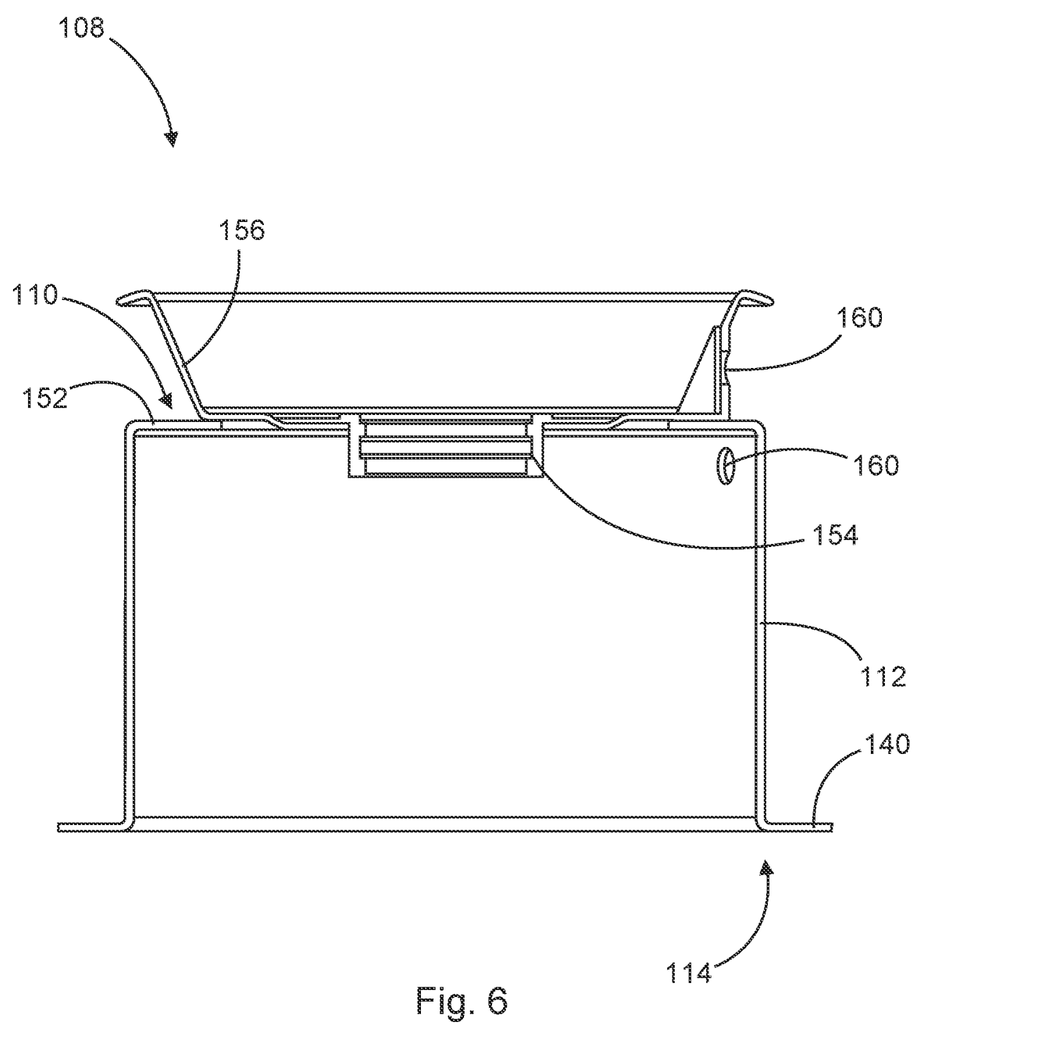

FIGS. 5 and 6 show different embodiments of spring brake portion housings 8, 108. Both embodiments comprise wall sections 12, 112 and first ends 10, 110, as well as second ends 14, 114. The first ends 10, 110 are opposite from the second ends 14, 114. At the first ends 10, 110, cover surfaces 52, 152 are arranged. The cover surfaces 52, 152 are substantially flat. Attached to the cover surfaces 52, 152 is a flange 56, 156. The flange 56, 156 is part of a service brake portion housing 58. Furthermore, the housing 8, 108 both comprise port opening 60, 160. Such port opening 60, 160 are also arranged at the flanges 56, 156. The housings 8, 108 furthermore comprise bosses 54, 154.

Making reference to FIG. 5, the spring brake portion housing 8 comprises a circumferential collar 40 for enabling a crimping connection with the base plate 24. FIG. 6 shows a circumferential flange 140 at the second end for providing a bolt nut connection with the base plate 124.

While the above description pertains to the preferred embodiments of the present invention, the invention is susceptible to modification, variation and change without departing from the proper scope and fair meaning of the accompanying claims.

LIST OF REFERENCE NUMERALS 2 spring brake actuator
4 service brake portion
6 spring brake portion
8 spring brake portion housing
10 first end
12 wall section
14 second end
16 locking mechanism
18 spring brake portion piston
20 piston pipe
22 compression spring
24 base plate
26 concentric bead
28 brake release device
30 brake release bolt
34 threaded boss of base plate
36 threaded portion of brake release bolt
38 outside surface of base plate
40 circumferential collar
46 circumferential projection of base plate
50 seal
52 cover surface
54 boss of cover surface
56 flange
58 service brake portion housing
60 port opening
62 diaphragm
64 service brake portion piston
66 seal holder
68 pressure inlet
108 spring brake portion housing
110 first end
112 wall section
114 second end
116 locking mechanism
124 base plate
126 concentric bead
134 threaded boss of base plate
138 outside surface of base plate
140 circumferential flange
142 bore
144 bolt nut
150 seal
152 cover surface
154 boss of cover surface
156 flange
160 port opening
166 seal holder
170 central axis

What is claimed is:

1. An actuator (2) for a commercial vehicle, the actuator (2) comprising a service brake portion (4) and a spring brake portion (6), the spring brake portion (6) having a housing (8) with
   a first end (10) proximal to the service brake portion (4),
   a wall section (12) extending from the first end (10),
   a second end (14) being distal to the service brake portion (4), and
   wherein a locking mechanism (16) is arranged between the wall section (12) and the second end (14) of the housing (8) and locks the wall section (12) to the second end (14) of the housing (8),
   wherein the second end (14, 114) comprises a base plate (24, 124) that encloses the housing (8, 108) at the second end (14, 114);
   wherein the locking mechanism (16) comprises a circumferential projection (46) of the base plate (24) that crimps the base plate (24) around a radially projecting circumferential flange (40) of the wall section (12);
   wherein the circumferential projection (46) of the base plate (24) is crimped over and wraps around the radially projecting circumferential flange (40) of the wall section such that material of the base plate (24) is disposed on opposite axial sides of the radially projecting circumferential flange (40) of the wall section (12) and is also disposed radially outboard relative to the radially projecting circumferential flange (40) of the wall section (12);
   wherein the second end of the housing is an axially terminal end of the housing and the base plate (24) and locking mechanism (16) thereof are disposed at the axially terminal end of the housing.

2. The spring brake actuator (2) according to claim 1, further comprising:
   a spring brake portion piston (18) located in the housing (8) for applying a braking force, the spring brake portion piston (18) including a piston pipe (20) configured to transfer the braking force to the service brake (4), and a compression spring (22) located between the second end (14) of the housing (8) and the spring brake portion piston (18), the compression spring (22) being operative to push the spring brake portion piston (18) away from the second end (14).

3. The spring brake actuator (2) according to claim 1, wherein the spring brake actuator (2) comprises a brake release device (28) having a brake release bolt (30) for moving the spring brake portion piston (18) against a force of the compression spring (22) towards a release state, and wherein the base plate (24) comprises a threaded boss (34) for receiving a threaded portion (36) of the brake release bolt (30) therein.

4. The spring brake actuator (2) according to claim 3, wherein the threaded boss (34) is arranged at an outside surface (38) of the base plate (24).

5. The spring brake actuator (2) according to claim 1, wherein at least one seal (50) is arranged between the base plate (24) and the wall section (12).

6. The spring brake actuator (2) according to claim 1, wherein the first end (10) comprises a cover surface (52), the cover surface (52) being arranged opposite from the base plate (24), and wherein the cover surface (52) is substantially flat.

7. The spring brake actuator (2) according to claim 6, wherein the cover surface (52) comprises a boss (54) for accommodating a piston pipe (20).

8. A commercial vehicle comprising the actuator (2) of claim 1.

9. An actuator (2) for a commercial vehicle, the actuator (2) comprising a service brake portion (4) and a spring brake portion (6), the spring brake portion (6) having a housing (8, 108) with a first end (10,110) proximal to the service brake portion (4), a wall section (12, 112) extending from the first end (10, 110), a second end (14,114) being distal to the service brake portion (4), and a locking mechanism (16, 116), wherein the locking mechanism (16, 116) secures the wall section (12, 112) to the second end (14, 114) of the housing (8, 108);

wherein the second end comprises a base plate (24, 124) that encloses the housing (8, 108) at the second end (14, 114);

wherein the first end (10, 110) comprises a cover surface (52, 152), the cover surface (52, 152) being arranged opposite from the base plate (24, 124), and wherein the cover surface (52, 152) is substantially flat and defines an central opening;

wherein the service brake portion (4) of the actuator (2) comprises a flange (56, 156), the flange (56, 156) being separate from the cover surface (52, 152) and attached to the cover surface (52, 152) at the first end (10, 110), the flange (56, 156) at least partially forming a service brake housing (58) of the service brake portion (4);

wherein the cover surface (52, 152) is a separate piece relative to the flange (56, 156), such that the cover surface (52, 152) is part of the housing (8, 108) of the spring brake portion (6) and the flange (56, 156) is part of the service brake housing (58) of the service brake portion (4);

wherein the cover surface (52, 152) fills the central opening combines with the flange (56, 156) to enclose the housing (8, 108) at the first end (10, 110);

wherein the second end of the housing (8) is an axially terminal end of the housing (8), and the locking mechanism (16, 116) is disposed at the axially terminal end;

wherein the wall section (12, 112) defines an outer cylindrical shape and includes a radially projecting flange (40, 140) that projects radially outward from the outer cylindrical shape;

wherein the base plate (24, 124) has a radially outer width that is greater than the outer cylindrical shape and wherein the base plate (24, 124) is fixed to the radially projecting flange (40, 140) radially outward relative to the outer cylindrical shape of the wall section (112) at the axially terminal end.

10. The spring brake actuator (2) according to claim 9, wherein at least one of the flange (56, 156) and a boss (54, 154) is welded to the cover surface (52, 152) of the housing (8, 108).

11. The spring brake actuator (2) according to claim 9, wherein at least one of the housing (8, 108), the flange (56, 156), and the base plate (24, 124) comprises sheet metal.

12. An actuator (2) for a commercial vehicle, the actuator (2) comprising a service brake portion (4) and a spring brake portion (6), the spring brake portion (6) having a housing (8, 108) with a first end (10, 110) of the housing (8, 108) proximal to the service brake portion (4), a wall section (12, 112) extending axially from the first end (10, 110), a second end (14,114) of the housing (8, 108) being distal to the service brake portion (4) and defining an axially terminal end of the housing (8, 108), and a locking mechanism (16, 116) that locks a base plate (24, 124) to the wall section (12, 112), wherein the locking mechanism (16, 116) is arranged between the wall section (12, 112) and the second end (14, 114) of the housing (8, 108) and secures the wall section (12, 112) to the second end (14, 114) of the housing (8, 108) at an interface that is radially outward relative to the wall section (12, 112);

wherein the locking mechanism (16, 116) is disposed at the axially terminal end of the housing;

wherein the base plate (24, 124) is substantially planar and has a radially outer width that is greater than the wall section;

wherein a seal (50, 150) is disposed at the axially terminal end between the base plate (24, 124) and the wall section n(12, 112) that sealingly encloses the spring brake portion (6) at the second end (14, 114) of the housing (8, 108);

wherein the base plate (24, 124) includes a threaded boss (34, 134) attached thereto at a radial central location of the base plate (24, 124), wherein the threaded boss (34, 134) receives a threaded portion (36) of a brake release bolt (30).

* * * * *